United States Patent
Hashiguchi

(10) Patent No.: US 7,353,913 B2
(45) Date of Patent: Apr. 8, 2008

(54) ELEVATOR HOISTING MACHINE AND MOTOR

(75) Inventor: Naoki Hashiguchi, Tokyo (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 166 days.

(21) Appl. No.: 10/523,762

(22) PCT Filed: Jun. 5, 2003

(86) PCT No.: PCT/JP03/07092

§ 371 (c)(1),
(2), (4) Date: Feb. 7, 2005

(87) PCT Pub. No.: WO2004/108579

PCT Pub. Date: Dec. 16, 2004

(65) Prior Publication Data

US 2006/0060428 A1    Mar. 23, 2006

(51) Int. Cl.
*B66B 11/08* (2006.01)

(52) U.S. Cl. ............... 187/254; 187/258; 310/261; 254/290; 254/316; 254/901

(58) Field of Classification Search ............... 187/254, 187/258, 286, 373; 254/290, 316, 901; 310/62, 63, 261; H02K 7/102; B66B 11/08, B66B 15/08
See application file for complete search history.

(56) References Cited

U.S. PATENT DOCUMENTS

| | | | |
|---|---|---|---|
| 4,306,165 A * | 12/1981 | Kitabayashi et al. | 310/59 |
| 4,739,969 A | 4/1988 | Eckersley et al. | |
| 5,665,944 A * | 9/1997 | Aulanko et al. | 187/277 |
| 5,982,060 A * | 11/1999 | Hakala et al. | 310/67 R |
| 6,851,520 B2 * | 2/2005 | Nagata et al. | 187/286 |
| 2001/0048253 A1 * | 12/2001 | Nakamura et al. | 310/59 |

FOREIGN PATENT DOCUMENTS

| | | |
|---|---|---|
| CN | 1410338 A | 4/2003 |
| DE | 198 32 208 C1 | 4/1999 |
| DE | 19906727 | 6/2000 |
| DE | 19958545 | 4/2001 |
| JP | 53-140888 | 11/1978 |
| JP | 2-10765 U | 1/1990 |
| JP | 2-62394 | 3/1990 |
| JP | 5-56618 | 3/1993 |

(Continued)

*Primary Examiner*—Peter M. Cuomo
*Assistant Examiner*—Stefan Kruer
(74) *Attorney, Agent, or Firm*—Buchanan Ingersoll & Rooney PC

(57) ABSTRACT

A elevator hoisting machine is provided with a stator mounting portion at which a stator core of a motor is mounted to a surface of a side opposite to a sheave in a sheave rotation centerline direction of the hoisting machine. A hat shape fixed frame member in which the stator mounting portion and a fixed main shaft that supports rotation of a rotor through a bearing are integrated. The elevator hoisting machine is characterized in that a brake device in which an inner radial surface of a cylindrical rotor mounting portion forms a braking surface. A motor is characterized in that the width of a magnet constituting a rotor is larger than the width of the stator core. The elevator hoisting machine is provided with the motor.

13 Claims, 13 Drawing Sheets

FOREIGN PATENT DOCUMENTS

| | | |
|---|---|---|
| JP | 11-32462 | 2/1999 |
| JP | 11-79686 | 3/1999 |
| JP | 2000-153973 | 6/2000 |
| JP | 2000-289954 | 10/2000 |
| JP | 2001-72358 | 3/2001 |
| JP | 2001-151443 | 6/2001 |
| JP | 2001-278571 | 10/2001 |
| JP | 2003-104666 | 4/2003 |

* cited by examiner

ELEVATOR HOISTING MACHINE AND MOTOR

TECHNICAL FIELD

The present invention relates to a thin type elevator hoisting machine mainly used in a machine room-less elevator.

BACKGROUND ART

FIG. 12 is a front elevation view of a conventional thin type hoisting machine for an elevator, disclosed in JP 2000-289954 A, for example, FIG. 13 is a cross sectional view for explaining a structure of the hoisting machine, and FIG. 14 is an enlarged view of a vicinity of a stator core of a motor section of the elevator hoisting machine.

A fixed main shaft 2 is securely fastened to a cup shape housing 1. A sheave 4, which is a portion of a rotation member 5, is mounted about the fixed main shaft 2, through a bearing 3. The housing 1 has a shape that covers the sheave 4, and a main rope that hauls the elevator enters and exits through an opening portion 1*a* opened in a portion of the housing 1. One end of a side opposite to a position at which the fixed main shaft 2 and the housing 1 are securely fastened together becomes a cylindrical rotor mounting portion 6*a* of a rotation support frame 6. A rotor 7 is mounted to the cylindrical rotor mounting portion 6*a*. There is a stator 8 in an inner diameter portion of the housing 1 opposite to the rotor 7 with a small space. The rotor 7 and the stator 8 form a motor that causes the sheave 4 to rotate. Further, a support frame 9 is securely fastened to one end of the cup shape housing 1 opposite to the position at which the cup shape housing 1 and the fixed main shaft 2 are securely fastened together. A brake frame 10*a* of a brake device 10 is attached to the support frame 9, making an inner diameter surface of the cylindrical rotor mounting portion 6*a* into a braking surface. A brake shaft 10*b* supported by the brake frame 10*a* is pushed onto an inner circumferential surface of the cylindrical rotor mounting portion 6*a*. The brake shaft 10*b* brakes rotation of the sheave 4. Further, a rotation shaft 11 is attached in the vicinity of the rotation center of the side having the cylindrical rotor mounting portion 6*a* of the rotation support frame 6. The rotation shaft 11 is joined to a rotation shaft 12*a* of an encoder 12 attached to the support frame 9.

A magnet 13 of the rotor 7 is expensive, and normally a width M1 of the magnet 13 of the rotor 7 is not made equal to or larger than a width C1 of a core 8*a*. Accordingly, a width W1 of the motor section of the thin type hoisting machine is substantially determined by the sum total of the dimension C1 of the core 8*a* of the stator 8, dimensions E1 and E1 of ends of a coil 14, and a plate thickness S1 of the support frame 9.

Conventional thin type elevator hoisting machines are structured as described above, and are thin in comparison with the previous elevator hoisting machines. However, the torque necessary for the elevator hoisting machine becomes larger, and although the elevator hoisting machine can be called thin, the absolute thickness gradually becomes larger.

With machine room-less elevators, arranging an elevator hoisting machine in a gap between a car within a hoistway and a hoistway wall is customary. However, the amount of space occupied as the hoistway, the so-called dead space within the hoistway, increases, whether or not in actual use, with increasing thickness of the elevator hoisting machine. Consequently, it is necessary to make the thin type elevator hoisting machine thinner.

DISCLOSURE OF THE INVENTION

The present invention resolves the problems described above of the conventional thin type elevator hoisting machines. An object of the present invention is to obtain a thin type elevator hoisting machine that is thinner than conventional thin type elevator hoisting machines, with few types of large size component parts, and having a housing that does not become an obstacle during installation and maintenance.

BEST MODES FOR CARRYING OUT THE INVENTION

Embodiments of the present invention are explained next.

Embodiment 1

Figure 1:
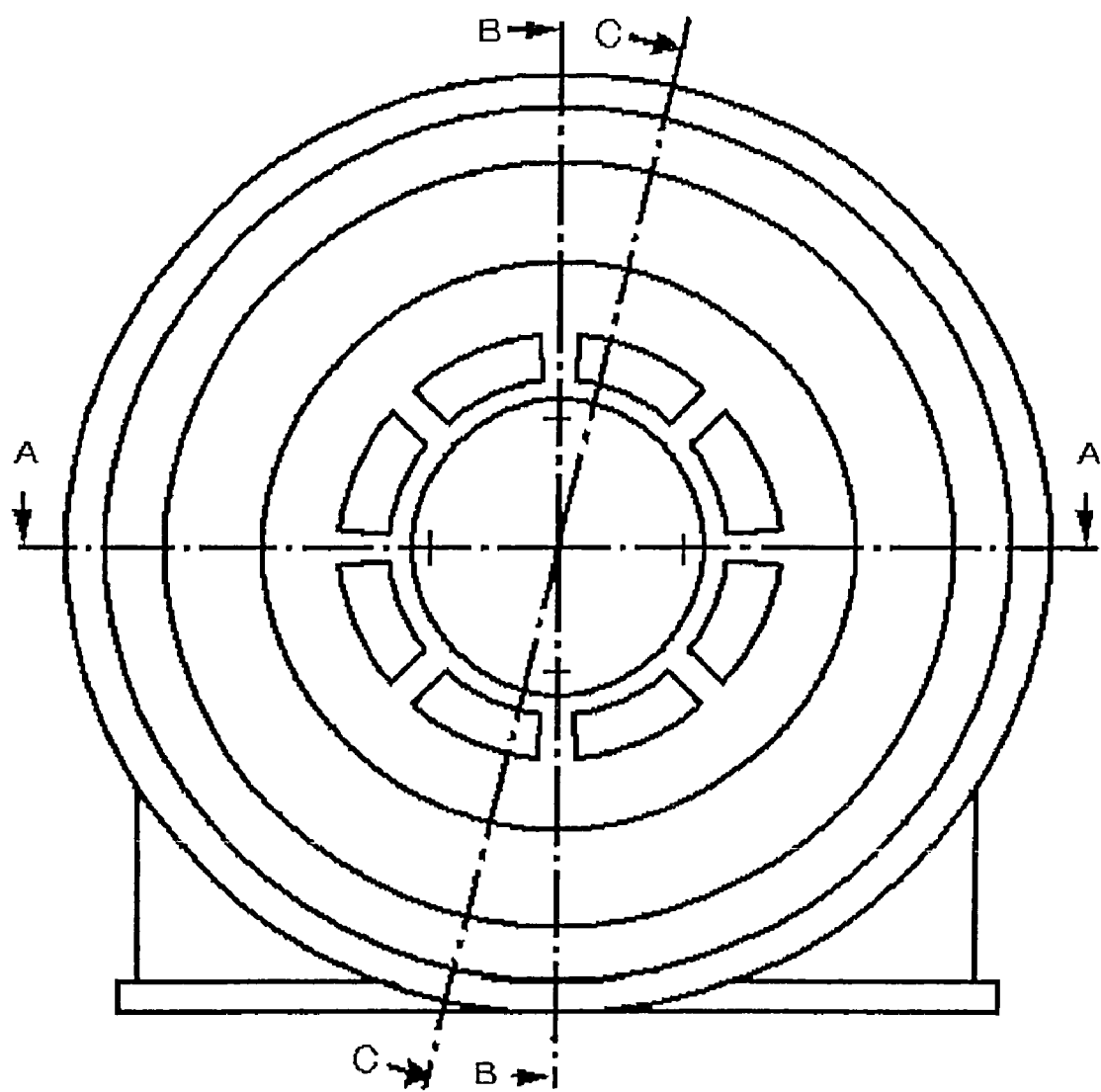
FIG. 1 is a front elevation view of a thin type elevator hoisting machine shown in embodiment 1 of the present invention.
Figure 2:
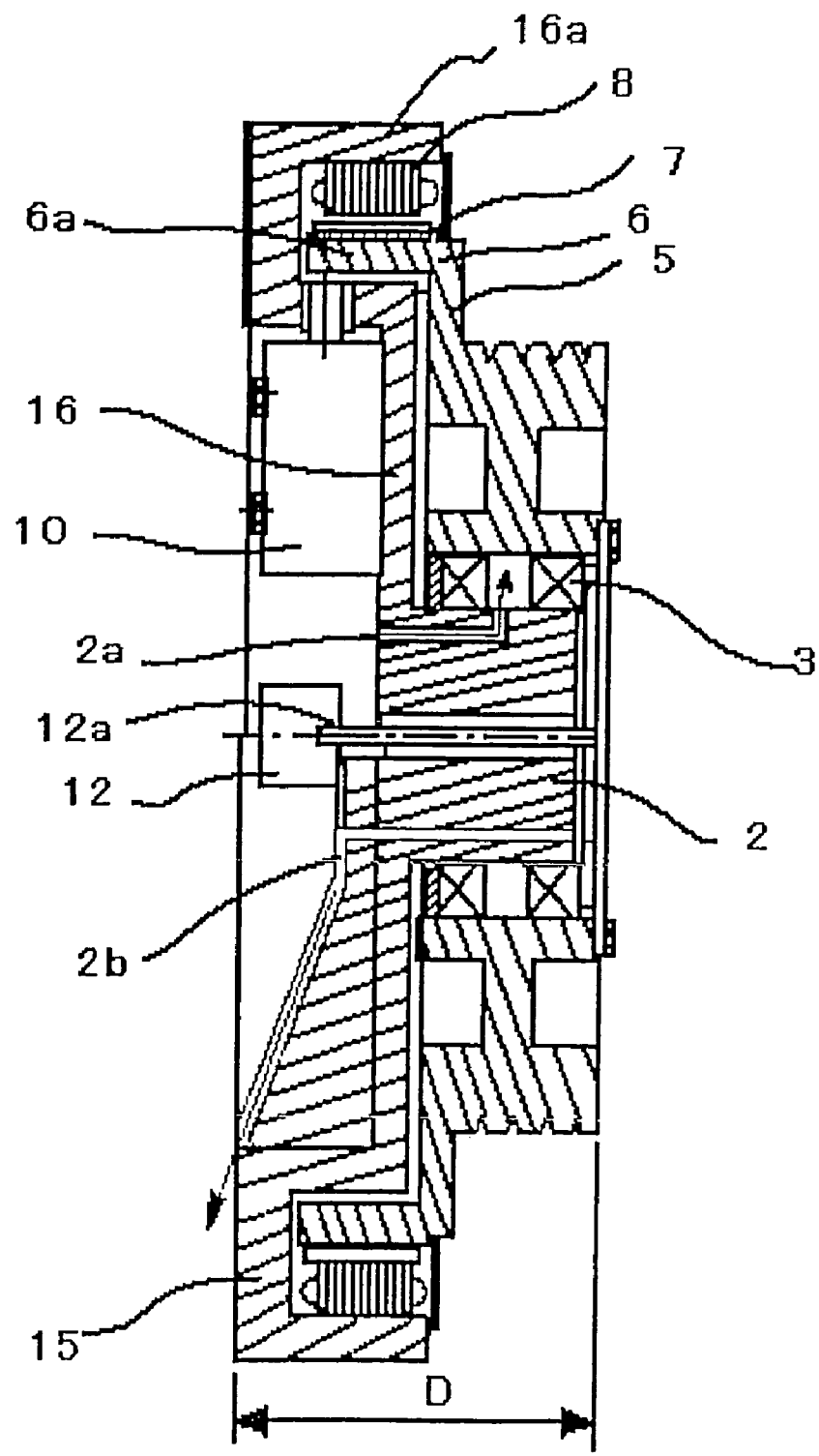
FIG. 2 is a cross sectional view of the thin type elevator hoisting machine shown in FIG. 1 taken along A-O-B.
Figure 3:
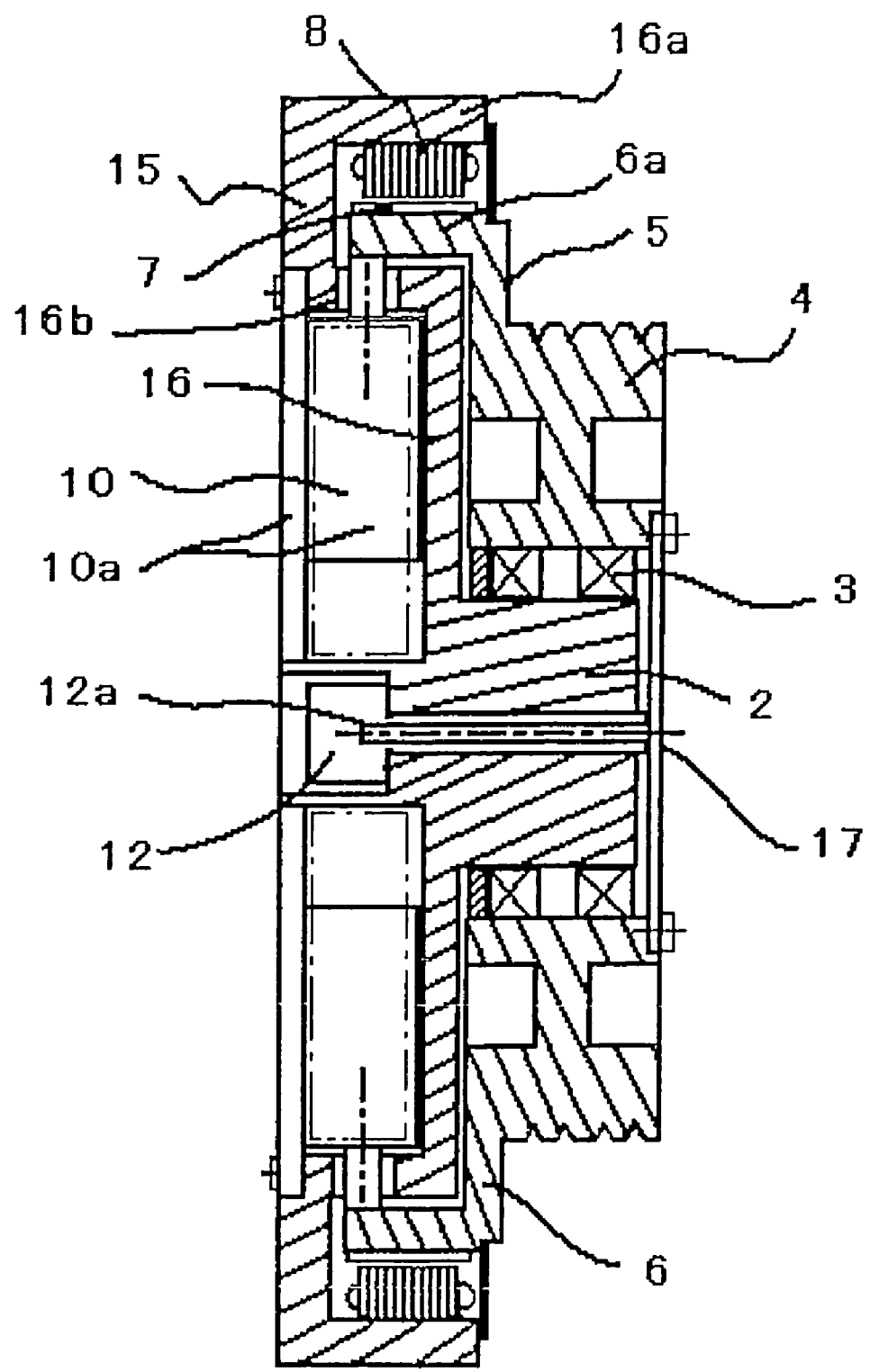
FIG. 3 is a cross sectional view of the thin type elevator hoisting machine shown in FIG. 1 taken along A-O-A.
Figure 4:
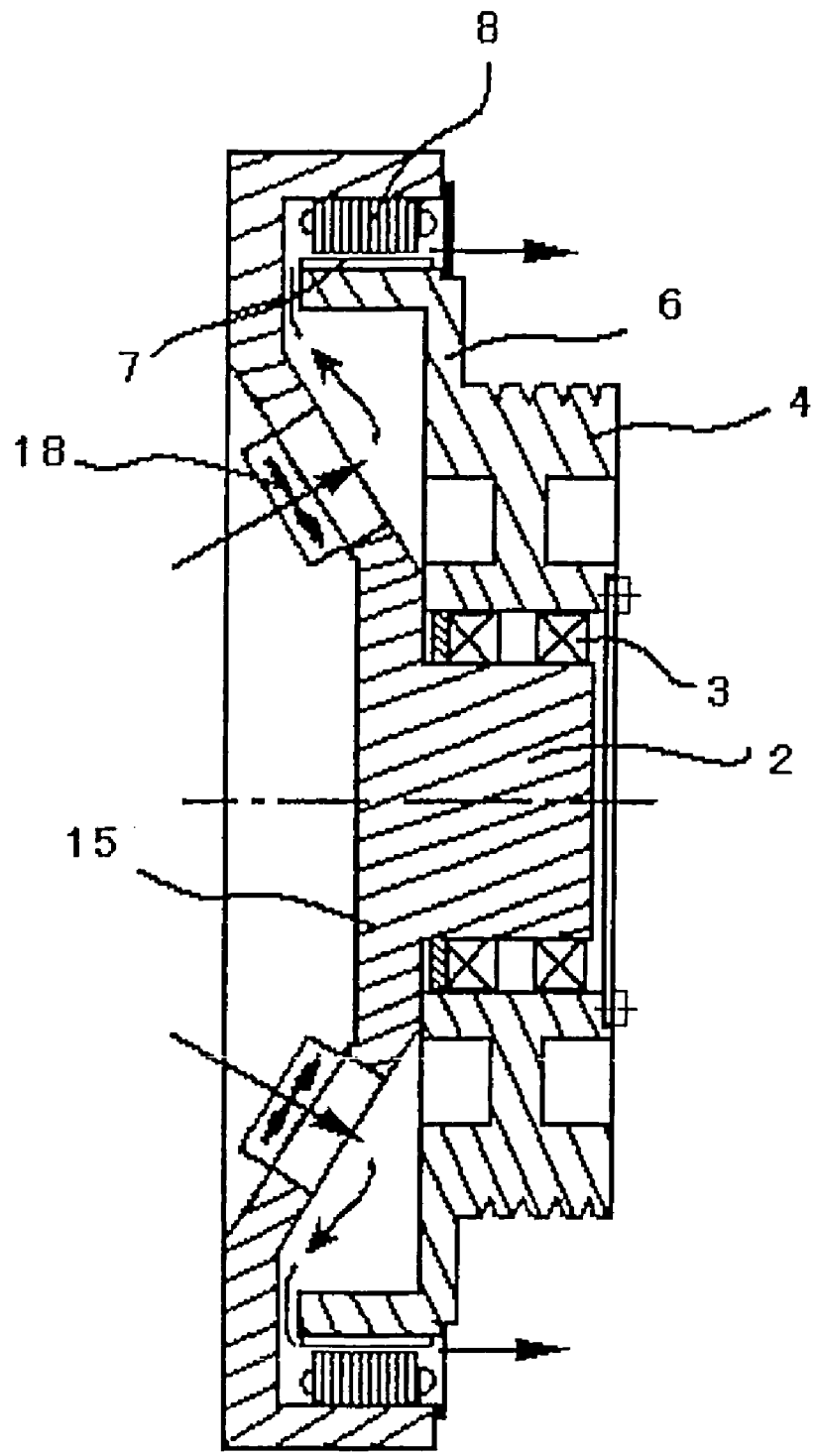
FIG. 4 is a cross sectional view of the thin type elevator hoisting machine shown in FIG. 1 taken along C-O-C.

Embodiment 1 of the present invention is explained using FIG. 1 to FIG. 7. FIG. 1 is a front elevation view of a thin type elevator hoisting machine of the present invention, FIG. 2 is a cross sectional view of the thin type elevator hoisting machine shown in FIG. 1 taken along A-O-B, FIG. 3 is a cross sectional view of the thin type elevator hoisting machine shown in FIG. 1 taken along A-O-A, and FIG. 4 is a cross sectional view of the thin type elevator hoisting machine shown in FIG. 1 taken along C-O-C.

As shown in FIG. 3, the hoisting machine is provided with a rotation member 5, a fixed member 15, and a bearing 3. The fixed member 15 is provided with a stator 8, a fixed frame member 16 in which a stator mounting portion 16a, to which the stator 8 is mounted, and a fixed main shaft 2 are integrated, a brake device 10 mounted to the fixed frame member 16, and an encoder 12. The rotation member 5 is provided with a rotation support frame 6 in which a rotor 7 and a rotor mounting portion 6a, to which the rotor 7 is mounted, are integrated, and a sheave 4 that is integrated with the rotation support frame 6. The fixed frame member 16 has a hat shape cross sectional shape in the vicinity of the mounting portion of the brake device 10. The term hat shape means a shape that is provided with a disk shape first extension portion that extends in a circumferential direction from one shaft end portion of the fixed main shaft 2, an inner side cylindrical portion that bends substantially in a right angle from the extension portion toward a side opposite the fixed shaft, a hollow disk shape second extension portion that extends in a circumferential direction toward a side opposite the fixed shaft of the inner side cylindrical portion, and an outer side cylindrical portion that bends substantially in a right angle at a terminus in the circumferential direction of the second extension portion, extending from the extension portion in the fixed shaft direction.

There is a region in a portion of the fixed frame 16 at which the brake device 10 is not mounted where, as shown in the lower half of FIG. 2, or in FIG. 4, a frame member extending obliquely from the shaft portion may be provided to the second extension portion as a substitute for the first extension portion and the inner side cylindrical portion.

A hollow portion is provided to the fixed main shaft 2 in the vicinity of its center of rotation. A rotation transmission member 17 that passes through the hollow portion transmits rotation of the rotation member 5 to a rotation shaft 12a of the encoder 12.

The rotation support frame 6 is provided with a disk shape extension portion that extends in a circumferential direction from one end of the sheave 4, and a cylindrical portion at an outer circumferential end of the extension portion that bends substantially in a right angle on a side opposite to the sheave 4. The rotor mounting portion 6a is provided on an outer circumferential surface of the cylindrical portion. An inner circumferential surface of the rotor mounting portion 6a becomes a braking surface of the brake device 10.

The fixed main shaft 2 of the fixed member 15 is inserted into the sheave 4 of the rotation member 5 through the bearing 3.

As shown in FIG. 3, the cylindrical portion of the rotation support frame 6 is inserted in a nested state between an inner side cylindrical portion of the stator 8 and an outer side cylindrical portion of the fixed frame member 16, forming a motor in which the rotor 7 and the stator 8 are opposing.

The brake device 10 is mounted to an inner circumferential side of the inner side cylindrical portion of the fixed frame member 16. The brake device 10 is mounted by a structure in which a brake frame 10a is joined to a shaft center side of the fixed frame member 16. The inner side cylindrical portion of the fixed frame member 16 becomes a closed structure having superior strength due to the brake frame 10a and the fixed frame member 16, as shown by a single dash broken line of FIG. 3. A braking shaft 10b extends from a brake main body 10c of the brake device 10 to the braking surface of the rotation support frame 6, passing through an opening portion 16b formed in the inner side cylindrical portion of the fixed frame member 16. The braking shaft 10b presses against the braking surface according to a braking operation instruction.

Figure 5:
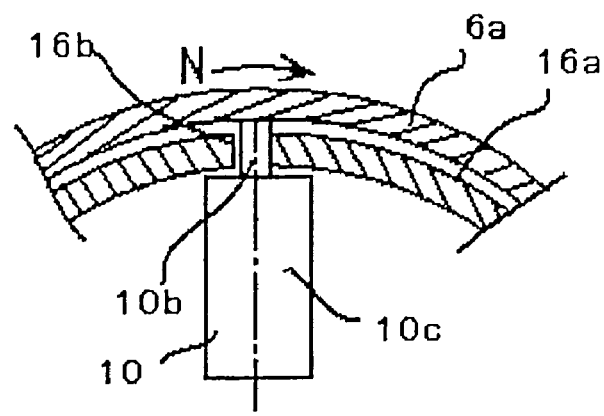
FIG. 5 is a front elevation view in the vicinity of a brake of the thin type elevator hoisting machine shown in FIG. 1.

FIG. 5 is a diagram that shows a front side view of the vicinity of the opening portion 16b of the fixed frame member 16. The opening portion 16b of the fixed frame member 16 achieves a guiding function when the braking shaft 10b moves, supporting a rotation direction force that acts on the brake shaft when the brake operates. Accordingly, it is not particularly necessary to provide a guide part for the brake shaft, or a support plate.

The thin type elevator hoisting machine of the present invention is configured as described above, and consequently is superior when compared to conventional thin type elevator hoisting machines in the following points.

First, a structural member that supports the first rotation portion, namely a housing 1, does not cover the outside of the rotation portion. Accordingly, the thickness of the sheave 4 in a rotation centerline direction becomes thinner by an amount equal to the housing 1 compared to conventional thin type elevator hoisting machines.

Second, the opening portion 16b of the fixed frame member 16 achieves a guiding function when the braking shaft 10b moves, and achieves a function of supporting the force in the rotation direction that acts on the braking shaft when the brake operates. Accordingly, a separate guiding part is unnecessary, and the number of parts can be reduced.

Third, while conventional thin type elevator hoisting machines have four types of large size parts, the housing 1, a support frame 9, the fixed main shaft 2, and the rotation support frame 6, the thin type elevator hoisting machine of the present invention only has two types of large parts, the rotation support frame 6 and the fixed frame support 16. For large size parts of this type, a long period of time is necessary to acquire raw materials, a large amount of processing time is necessary, and a large amount of space is necessary for storing the materials and the finished parts. Further, when there are many types of large size parts like these, this causes a derivative problem in that it takes a lot of effort to obtain the parts and manage production for this structure. The number of large size part types is thus reduced, and deficiencies like those described above are thus mitigated, and productivity increases.

Fourth, the housing 1 does not cover the sheave 4. With conventional thin type elevator hoisting machines, the sheave 4 is covered by the housing 1, and there is a problem in that the housing 1 becomes an obstruction when wrapping a rope about the sheave 4 when hanging the rope during elevator installation or performing regular rope replacement for an already installed elevator, making work difficult to perform. With the thin type elevator hoisting machine of the present invention, the housing 1 does not cover the sheave 4, and problems such as these thus do not occur.

As shown in FIG. 2, a lubricating oil injection opening 2a and a lubricating warm water discharge opening 2b are provided in the fixed main shaft 2. New lubricating oil is injected from the lubricating oil injection opening 2a during periodic maintenance. The injected lubricating oil lubricates the bearing 3, and discharge oil that has decomposed through use is discharged from the discharge opening 2b, through a guide way provided in the fixed frame member, to a portion outside of the hoisting machine. Normal maintenance of the thin type hoisting machine involves discharging oil from, and supplying oil to, the bearings and verification of brake performance. Accordingly, normal maintenance work can be confined to one side by providing the lubricating oil injection opening and the discharge port. The hoistway wall can thus be moved nearer, almost to a surface that is on a side opposite that where maintenance work is unnecessary, that is, a surface having the sheave. Hoistway space can thus be reduced to a minimum.

As shown in FIG. 4, a fan 18 is installed in the frame member that extends obliquely from the fixed frame member 16. The fan 18 sends air in the direction of an arrow in the figure, thus cooling the motor section. The fan 18 is attached to the oblique member, so temperature increases in the motor section can be suppressed without increasing the thickness of the hoisting machine.

Figure 6:
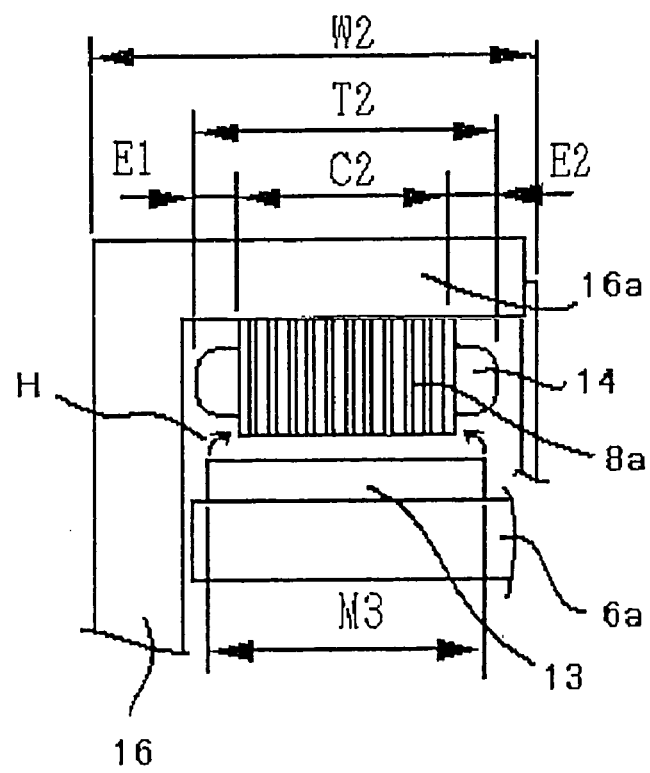
FIG. 6 is an enlarged view in the vicinity of a motor section of the thin type elevator hoisting machine shown in FIG. 1.

FIG. 6 is an enlarged view of the vicinity of a core 8a of the stator 8 of the motor section of the thin type elevator hoisting machine of the present invention.

In order to make the width of the motor section smaller, the total width of a coil is made smaller to a limiting width at which a necessary torque can be ensured, and a width M3 of a magnet 13 is made larger than a width C2 of the core 8a by several millimeters. When the width M3 of the magnet 13 is several millimeters larger than the width C2 of the core 8a, magnetic flux H appears from both ends of the magnet 13. Putting the magnetic flux H to practical use makes the width of a coil 14 necessary in order to obtain an identical torque smaller, and makes the width of the motor section smaller. A thickness D of the thin type hoisting machine is thus made thinner.

Figure 7:
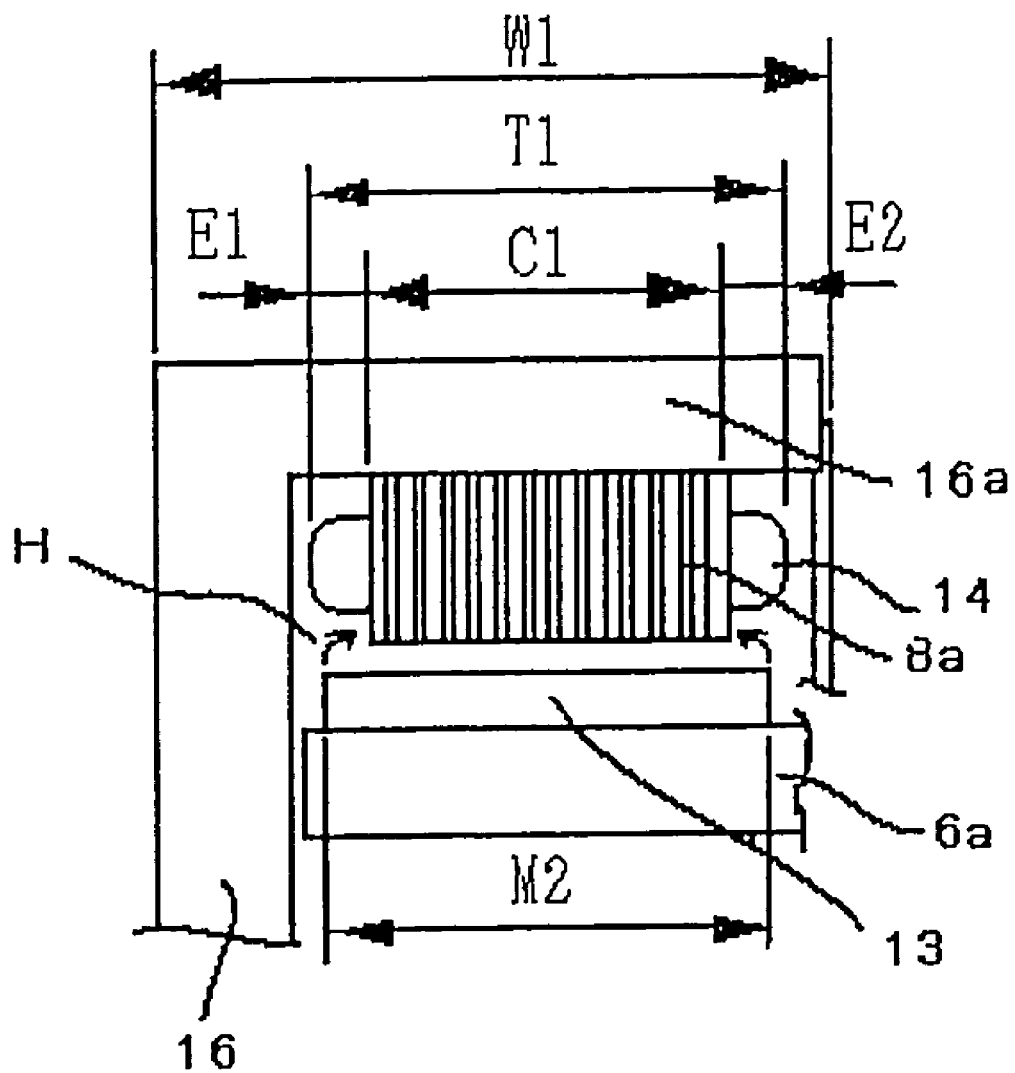
FIG. 7 is an enlarged view of the vicinity of the motor section showing a comparison to FIG. 6 for explanation.
Figure 14:
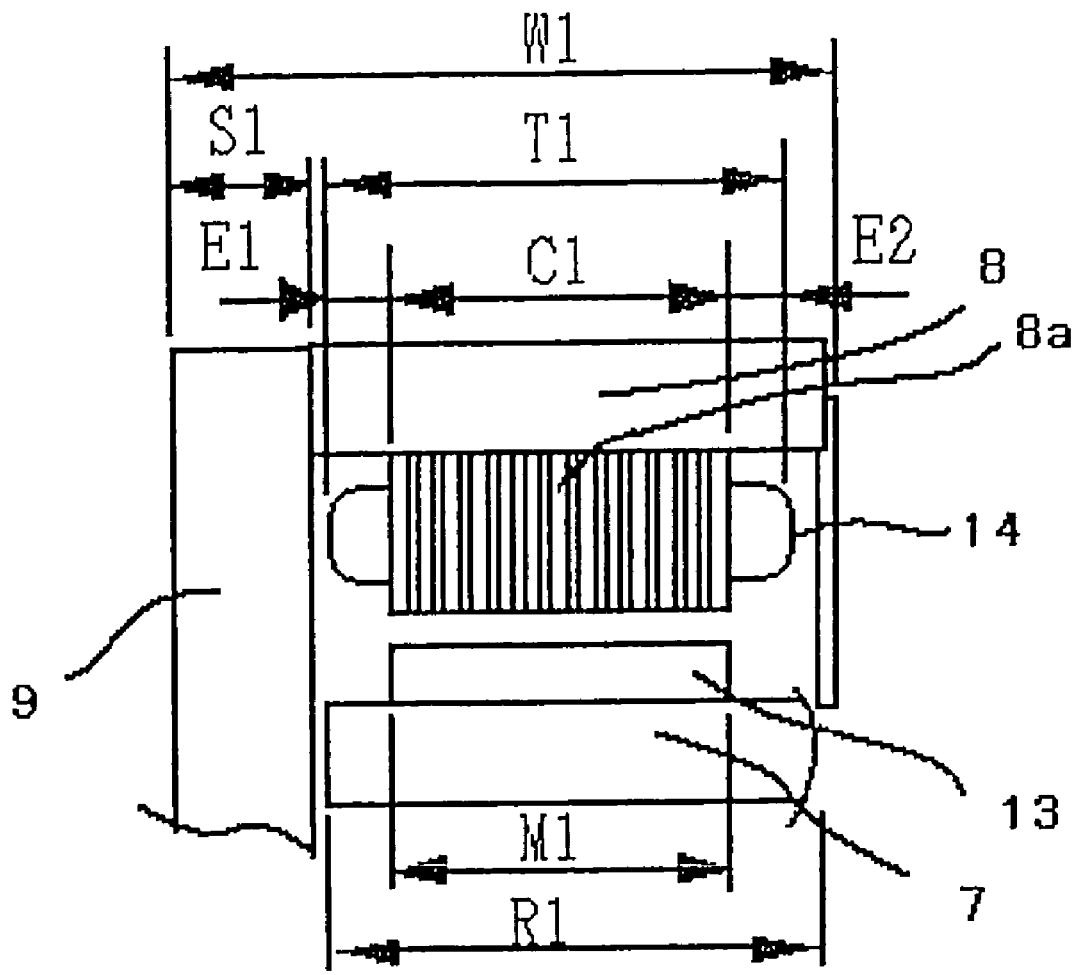
FIG. 14 is an enlarged view of the vicinity of a motor section of the conventional thin type elevator hoisting machine.

In other words, even if width dimensions of motors are the same W1 as shown in FIG. 14 and FIG. 7, magnetic flux appears from both ends of the magnet 13 with the motor of FIG. 7. Accordingly, a larger torque is obtained than that of the motor of FIG. 14. Conversely, even when the width of the core 8a is set to C2, which is smaller than C1, and the width of the magnet 13 is set to M3, which is smaller than M2, as shown in FIG. 6, a torque equal to that of the motor shown in FIG. 14 can be obtained. By thus making the width of the core 8a smaller, the motor width can be set to W2, which is smaller than W1, at an identical motor torque. The thickness of the thin type elevator hoisting machine can thus be made additionally smaller than that of conventional thin type elevator hoisting machines.

The structure in which the fixed main shaft 2 and the fixed frame member 16 are separate members that fit together is used here. Further, the brake device 10 and the fixed frame member 16 are securely fastened together in the vicinity of the second extension portion of the fixed frame member 16, thus forming a rigid closed structure as shown by the broken line in the figure.

Embodiment 2

Figure 8:
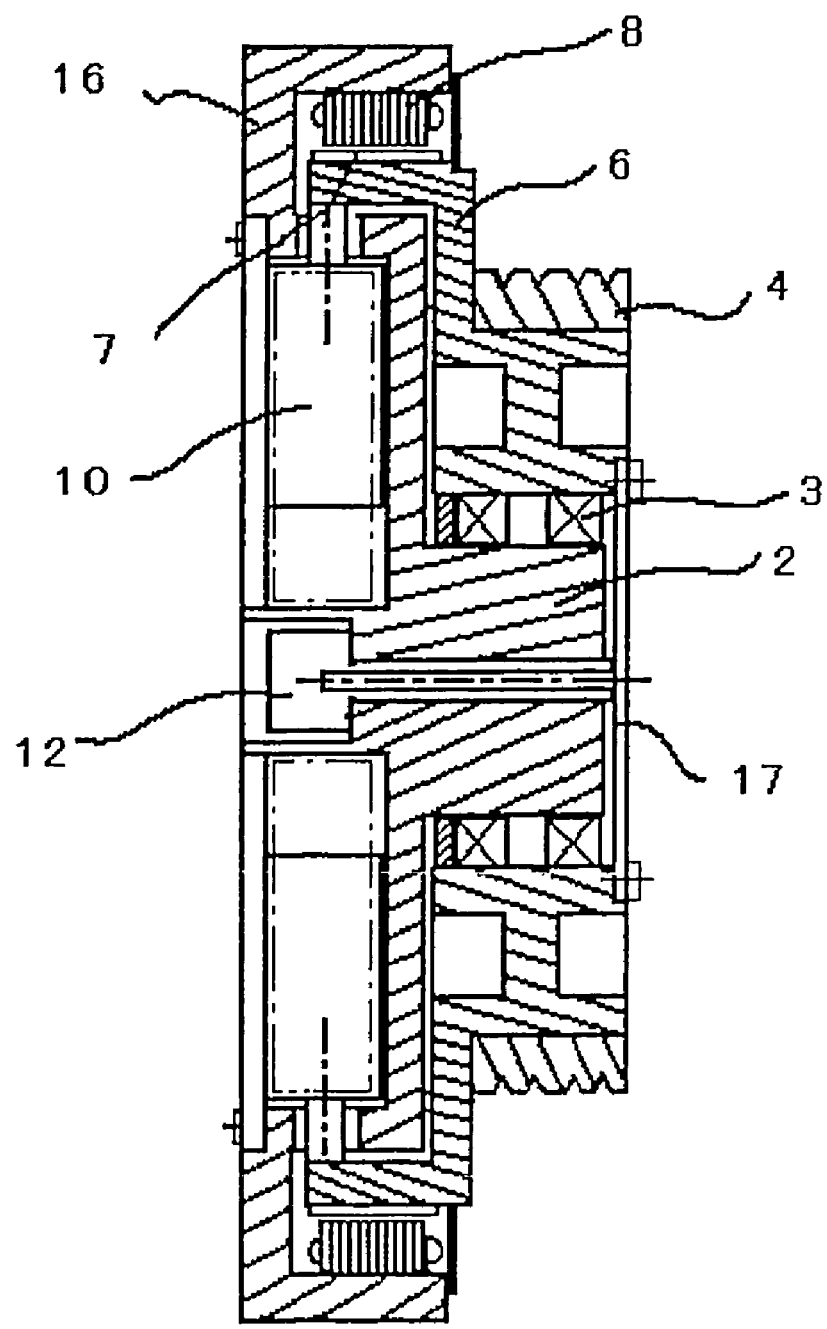
FIG. 8 is a cross sectional view of a thin type elevator hoisting machine shown in embodiment 2 of the present invention.

FIG. 8 is a cross sectional view of a thin type elevator hoisting machine of embodiment 2 of the present invention. The sheave 4 and the rotation support frame 6 are separate members here.

The sheave 4 and the rotation support frame 6 are securely fastened together. The number of parts becomes larger compared to the number in embodiment 1, but there is an advantage in that it is easy to handle a change in the number of ropes wound about the sheave 4.

Embodiment 3

Figure 9:
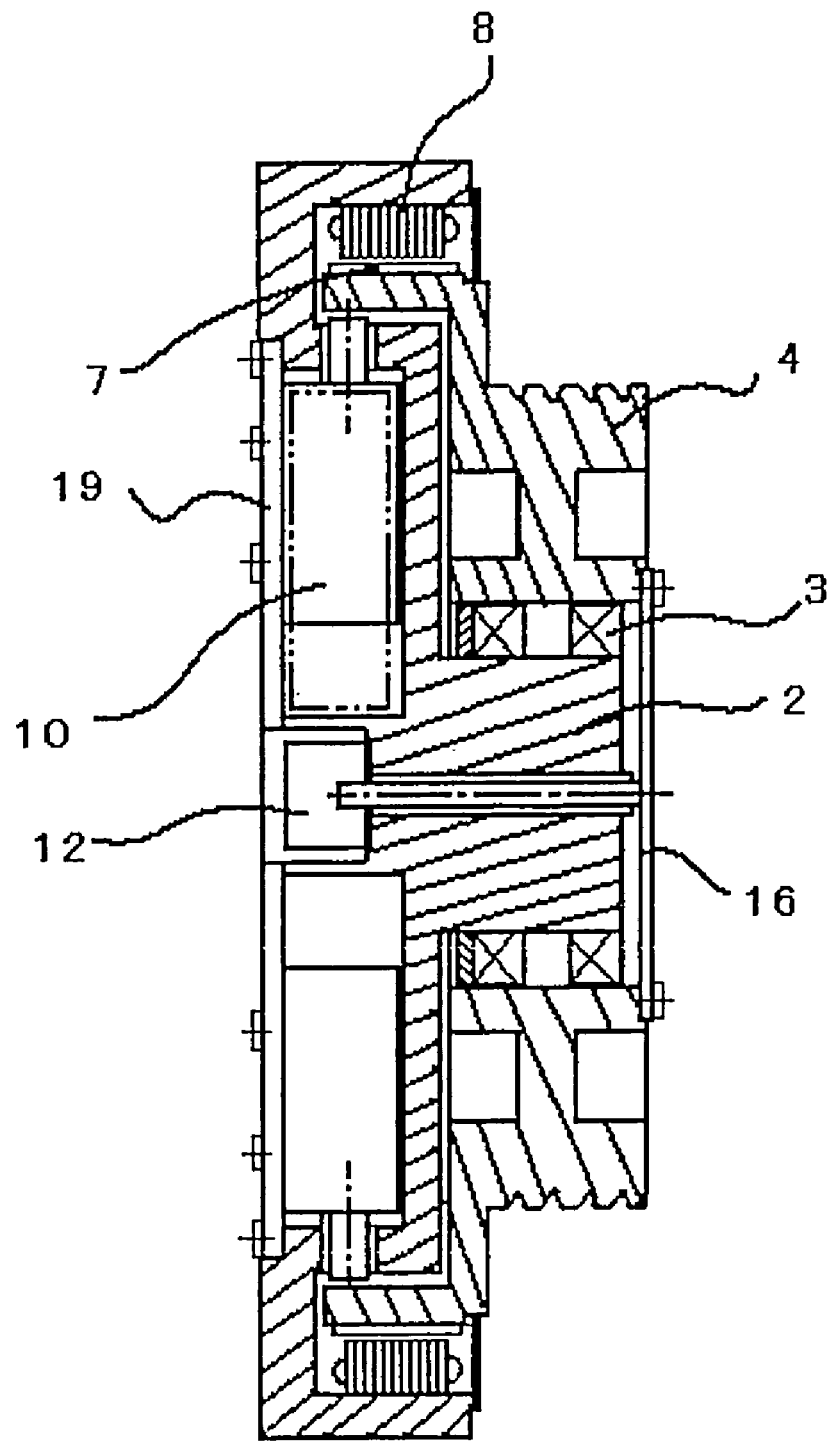
FIG. 9 is across sectional view of a thin type elevator hoisting machine shown in embodiment 3 of the present invention.

FIG. 9 is a cross sectional view of a thin type elevator hoisting machine of embodiment 3 of the present invention. The brake device 10 has a structure in which the brake main body portion 10c is tightly fastened to a brake attachment plate 19. The brake attachment plate 19 and the fixed portion frame member 16 are joined, thus forming a rigid closed structure. The brake device 10 and the brake attachment plate 19 are separate members, and handling thereof is easy compared to the integrated brake device shown in embodiment 1.

Embodiment 4

Figure 10:
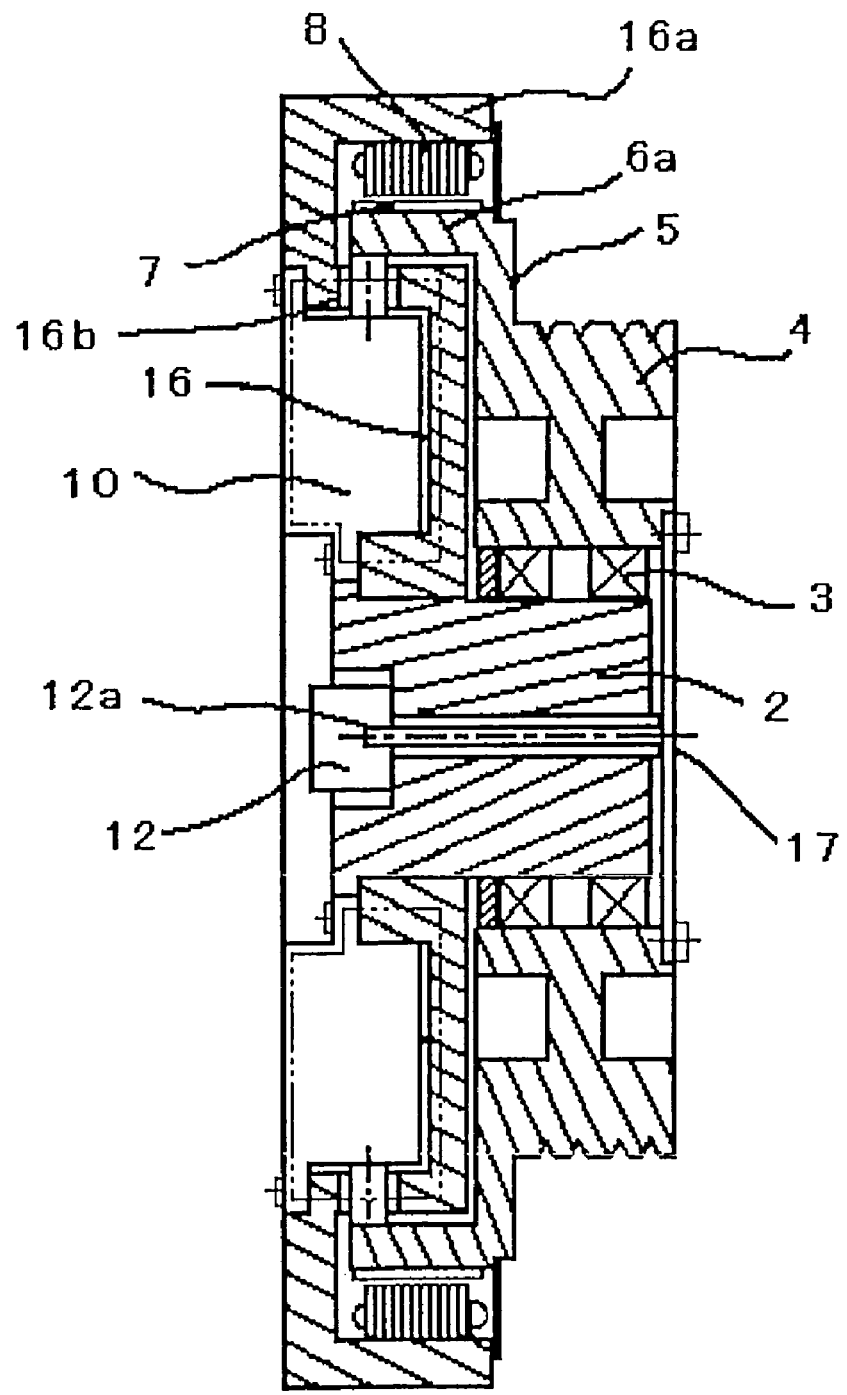
FIG. 10 is a cross-sectional view of a thin type elevator hoisting machine shown in embodiment 4 of the present invention.

FIG. 10 is a cross-sectional view of a thin type elevator hoisting machine of embodiment 4 of the present invention. The fixed main shaft 2 and the fixed frame member 16 have a structure in which separate members are fitted together, and the brake device 10 and the fixed frame member 16 are joined, thus forming a rigid closed structure.

Embodiment 5

Figure 11:
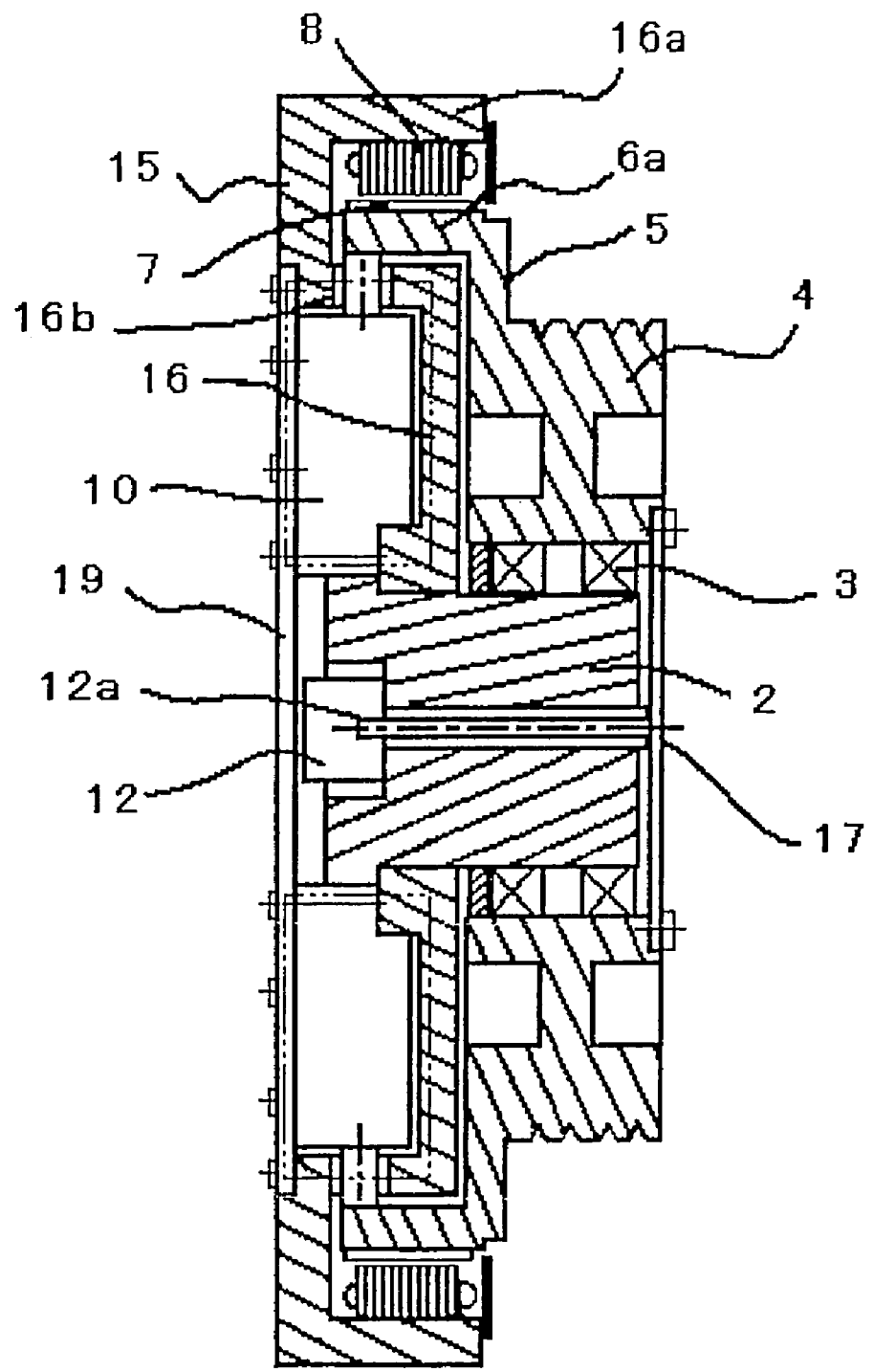
FIG. 11 is a cross-sectional view of a thin type elevator hoisting machine shown in embodiment 5 of the present invention.
Figure 12:
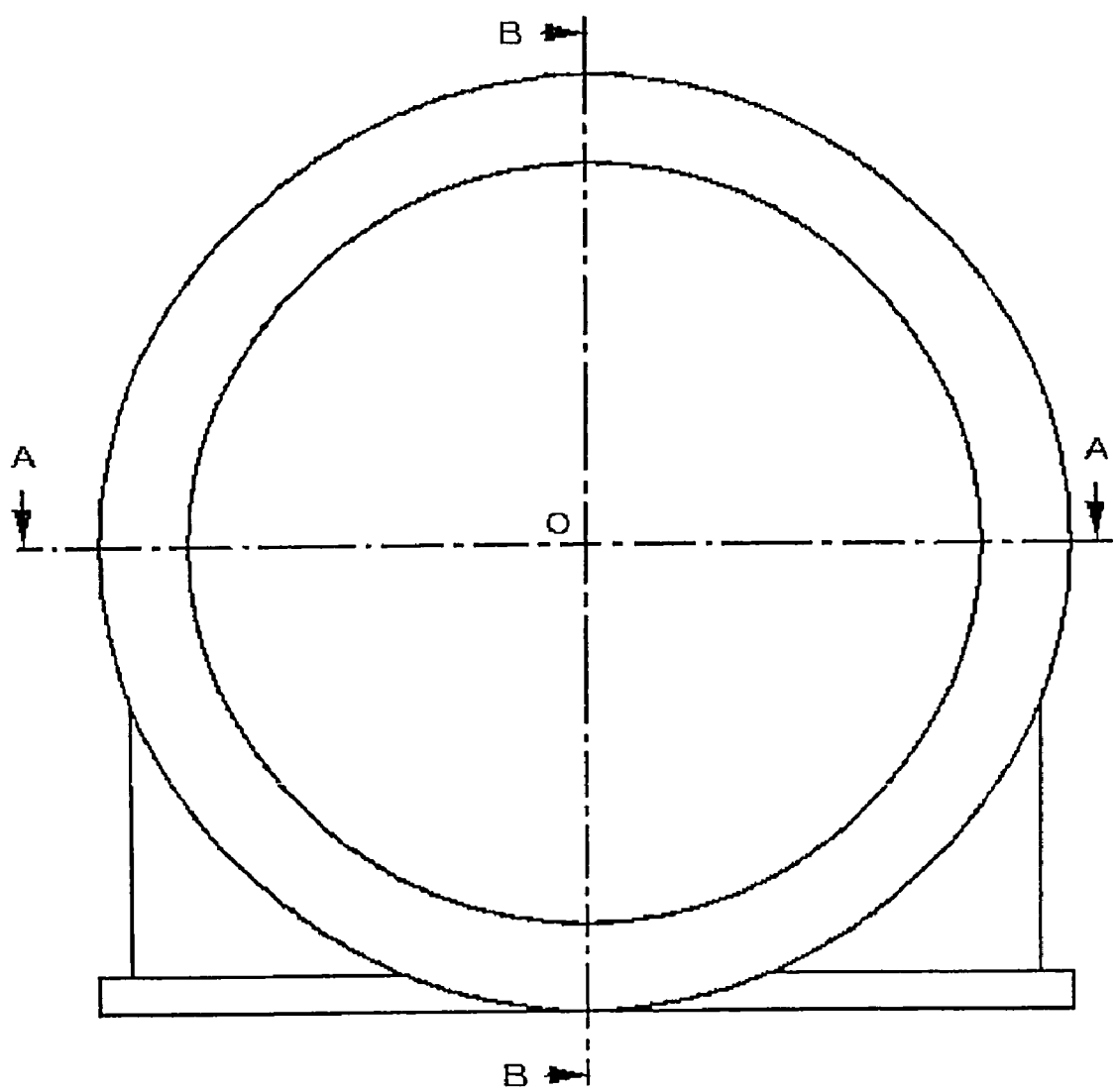
FIG. 12 is a front elevation view of a conventional thin type elevator hoisting machine.
Figure 13:
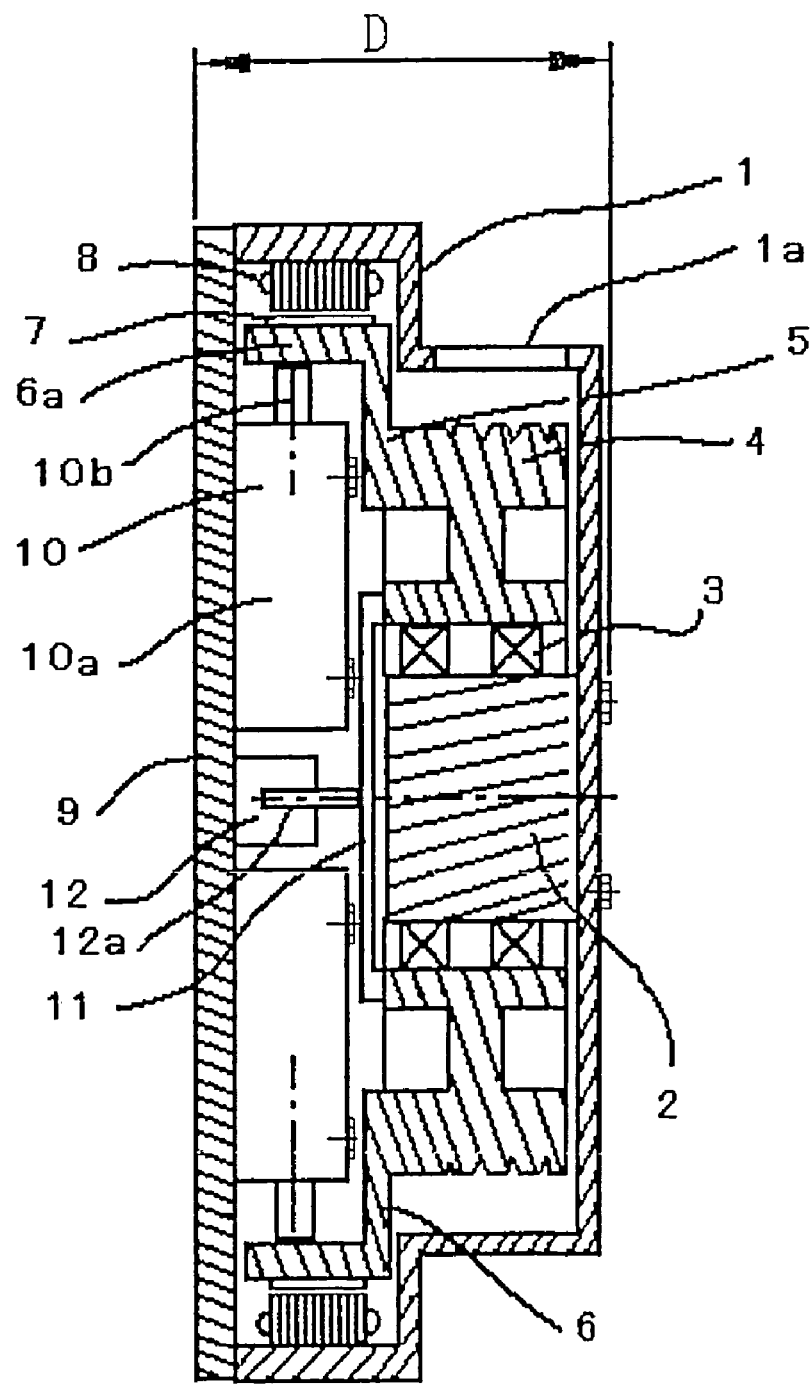
FIG. 13 is a cross sectional view of the conventional thin type elevator hoisting machine.

FIG. 11 is a cross-sectional view of a thin type elevator hoisting machine of embodiment 5 of the present invention. In this embodiment the fixed main shaft 2 and the fixed frame member 16 have a structure in which separate members are fitted together, and the brake device 10 in which the brake main body portion 10c is tightly fastened to the brake attachment plate 19 is used. The brake attachment plate 19 and the fixed portion frame member 16 are joined, thus forming a rigid closed structure.

It should be noted that, although the present invention is explained by using an example of a PM motor that uses a permanent magnet in the rotor, it is also obvious that the present patent can also be applied to an IPM motor, an induction motor, and the like.

Further, although an inner rotor type hoisting machine in which a center shaft rotates is used for an example in the explanation, it is obvious that the structure shown in the present invention can also be applied to an outer rotor type hoisting machine in which the center shaft is fixed and an outer circumferential portion rotates, and to a disc motor.

The invention claimed is:

1. An elevator-hoisting machine comprising:
a sheave;
a fixed main shaft that supports rotation of the sheave through a bearing;
a rotation support frame comprising a rotor mounting portion formed integrally with the sheave or fixed to the sheave;
a fixed frame body comprising a hollow extended portion, a cylindrical portion and a stator mounting portion, the extended portion having a disc-like shape and being extended outwardly in a radial direction of the sheave, the cylindrical portion being bent approximately in a vertical direction from the extended portion and being extended toward the fixed main shaft, the stator mounting portion being provided at the cylindrical portion to oppose the rotor mounting portion; and
a motor including a rotor mounted to the rotor mounting portion, and a stator mounted to the stator mounting portion, wherein
a portion of the rotation support frame, which is located between the rotor mounting portion of the rotation support frame and the sheave, is extended outwardly in a radial direction of the sheave and has a hollow-disc-like shape, and
a diameter of the rotor mounting portion in the radial direction is substantially larger than a diameter of the sheave in the radial direction.

2. The elevator-hoisting machine according to claim 1, wherein the fixed frame body is provided with a hat shape cross sectional shape.

3. The elevator-hoisting machine according to claim 1, wherein the fixed main shaft is jointed to the fixed frame member, making a fixed member.

4. The elevator-hoisting machine according to claim 1, further comprising a motor comprising a cylindrical rotor mounting portion and a stator mounting portion disposed in a radial direction of rotation, maintaining a gap with the rotor mounting portion, and is characterized in that a brake device in which an inner radial surface of the cylindrical rotor mounting portion forms a braking surface.

5. The elevator-hoisting machine according to claim 1, wherein an injection opening for supplying lubricating oil to the bearing and a discharge opening for discharging lubricating oil from the bearing are provided in a surface on a side opposite to the sheave in the sheave rotation centerline direction of the fixed main shaft.

6. The elevator-hoisting machine according to claim 1, wherein a blower fan is attached to an inner portion of the fixed frame member.

7. The elevator-hoisting machine according to claim 1, wherein the sheave and a rotation member are integrated.

8. The elevator-hoisting machine according to claim 1, wherein the sheave and the rotation member are separate members.

9. The elevator-hoisting machine according to claim 2, wherein said hat shape including a disk shape first extension portion that extends in a circumferential direction from a fixed main shaft, an inner side cylindrical portion that bends substantially in a right angle from the first extension portion toward a side which is opposite the fixed shaft, a hollow disk shape second extension portion that extends in a circumferential direction toward a side opposite the fixed shaft and an outer side cylindrical portion that bends substantially in a right angle at the end of second extension portion.

10. The elevator-hoisting machine according to claim 4, wherein an opening portion is provided to the fixed frame member in a region adjacent to the braking surface of the rotor mounting portion, and a braking shaft of the brake device is pushed against the braking surface, through the opening portion.

11. The elevator-hoisting machine according to claim 4, wherein the fixed frame member is extended to a side opposite to the sheave of the fixed main shaft, and the extended portion and the brake device, or an attachment plate that securely fastens to the brake device, make a fitted structure and form a closed structure.

12. The elevator-hoisting machine according to claim 4, wherein the fixed frame member and the brake device, or an attachment plate that securely fastens to the brake device, are securely fastened at a side opposite to the sheave of the fixed main shaft of the fixed frame member, and the brake device or an attachment plate securely fastens to the brake device, and a second extension portion of the fixed frame member are securely fastened, forming a closed structure.

13. The elevator-hoisting machine according to claim 5, wherein a guide way for the lubricating oil discharged from the bearing portion is provided to the fixed frame member.

* * * * *